United States Patent
Swanson (10) Patent No.: US 7,316,835 B1
(45) Date of Patent: *Jan. 8, 2008

(54) WALL PATCH

(75) Inventor: Randall Eric Swanson, Camas, WA (US)

(73) Assignee: Jerry Brower, Vancouver, WA (US)

( * ) Notice: Subject to any disclaimer, the term of this patent is extended or adjusted under 35 U.S.C. 154(b) by 89 days.

This patent is subject to a terminal disclaimer.

(21) Appl. No.: 10/618,166

(22) Filed: Jul. 10, 2003

Related U.S. Application Data (62) Division of application No. 09/595,635, filed on Jun. 16, 2000, now Pat. No. 6,607,621.

(60) Provisional application No. 60/170,477, filed on Dec. 13, 1999.

(51) Int. Cl.
*B32B 3/26* (2006.01)
*B32B 35/00* (2006.01)

(52) U.S. Cl. .......................... 428/63; 428/99; 428/343; 428/354; 156/71; 156/94; 156/98; 29/402.11; 29/402.09; 52/514

(58) Field of Classification Search ................ 428/63, 428/99, 343, 354; 156/71, 94, 98; 29/402.11, 29/402.09; 52/514
See application file for complete search history.

(56) References Cited

U.S. PATENT DOCUMENTS

| | | | |
|---|---|---|---|
| 1,044,323 A | 11/1912 | Wiggin | |
| 3,215,243 A | 11/1965 | Dickerson | |
| 4,008,115 A | 2/1977 | Fairbanks et al. | |
| 4,057,898 A | 11/1977 | Piosky | |
| 4,135,017 A | 1/1979 | Hoffmann, Sr. | |
| 4,358,495 A | 11/1982 | Parker | |
| 4,460,420 A | 7/1984 | Estrada | |
| 4,584,218 A | 4/1986 | Travis | |
| 4,602,971 A * | 7/1986 | Bergeron et al. | 156/94 |
| 5,075,149 A | 12/1991 | Owens et al. | |
| 5,321,206 A | 6/1994 | Hibler | |
| 5,820,958 A | 10/1998 | Swallow | |
| 5,925,204 A | 7/1999 | Hoffmann, Sr. | |
| 5,960,603 A | 10/1999 | Redden et al. | |
| 6,231,949 B1 | 5/2001 | Hoffmann, Sr. | |
| 6,607,621 B1 * | 8/2003 | Swanson | 156/94 |

OTHER PUBLICATIONS

Fasson Smudgeproof Kimdura S4600/78#BK, Specification #74259, Mar. 3, 2000, Fasson roll North America, Painesville, Ohio.

(Continued)

*Primary Examiner*—Daniel Zirker
(74) *Attorney, Agent, or Firm*—Marger Johnson & McCollom PC (57) ABSTRACT

A wall patch includes a body with a lower surface and an upper surface. An adhesive is located on the lower surface to secure the wall patch to a wall surface. The upper surface is ready-to-paint and can also be pre-textured, if desired. A center reinforcement can be a rigid plastic or metal wall patch, or a flexible plastic or fibered paper wall patch, without a textured upper surface. A method for repairing a hole in a wall includes placing a wall patch over the hole and directly painting the upper surface of the wall patch. The method can further include placing a center reinforcement over the hole before applying the wall patch.

19 Claims, 6 Drawing Sheets

OTHER PUBLICATIONS

National Home Center News web site http://www.homecenternews.com/advertisers/walltool/wallrepair.html.

CGC, Inc. web site http://www.cgcinc.com/cgcdiy/DIYPRODS/.

United States Gypsum web site http://www.usg.com/pressroom/gyprels.

* cited by examiner

WALL PATCH

This application is a divisional application of U.S. Ser. No. 09/595,635, filed on Jun. 16, 2000 now U.S. Pat. No. 6,607,621, which claimed priority from U.S. Provisional Application Ser. No. 60/170,477 filed Dec. 13, 1999.

BACKGROUND OF THE INVENTION

This invention relates generally to wall patches and methods for repairing holes in sheetrock, wallboard, or other wall surfaces.

The sheetrock repair industry has been unable to provide a reliable wall repair system and method that are simple, fast, and strong. Traditional wall repair systems, for example, include a myriad of supplies and equipment that must be used to repair even small wall holes. Specifically, a typical drywall repair kit includes a curable, setting-type repair compound (or "mud"), drywall tape, sandpaper, a compound spreader, a cutting tool, a mixing tray, a mixing stick, sheetrock replacement panels, and more. Nearly all of these tools and supplies are required to complete even a relatively minor repair job.

Traditional wall repair methods that use these systems are difficult and time-consuming. This is because the traditional approach to repairing holes in sheetrock walls requires a series of fairly complex steps. Specifically, the traditional approach for a small hole begins by mixing the repair compound. A porous wall patch or strips of drywall tape adapted to receive the repair compound are then placed over the hole. The curable repair compound is then applied to the damaged wall area over the porous wall patch or drywall tape. Once the repair compound is applied, it must be allowed to cure. Unfortunately, even fast-curing repair compounds take approximately between 60-90 minutes to cure. Other repair compounds may take a day or more to cure. After the compound cures, the repaired area must be sanded flush with the rest of the wall. Following sanding, a texture coat must be applied to the repaired area to match the texture of the surrounding wall area. Finally, once the texture coat has dried, the repaired area is painted to match the color of the surrounding wall area.

If the hole is fairly large, the repair method is even more complex. Specifically, to repair a large hole, an area of sheetrock encompassing the hole must generally be cut out of the wall and a replacement piece of sheetrock must be cut to match the exact size of the removed area. The replacement sheetrock is placed within the cutout area and drywall tape is placed around the edges of the cutout. Mud is placed over the tape, allowed to cure, and then sanded. The entire patch area must then be textured and painted to match the surrounding wall surface.

Repairing a crack according to the prior art is also fairly involved. First, loose plaster around the crack must be removed. The crack is then cleaned so that it is wider at the bottom than on the surface. Loose plaster should then be removed before applying patching plaster. The crack is next filled with patching plaster using a criss-cross motion to work it in. A putty knife is used to feather the edges of the patch so that it will be less visible. After the putty dries, the repaired area is sanded lightly and, only then, is it ready to be painted.

In addition to the complexity, time, and number of materials required by the prior art repair methods, the repair areas of the prior art are often conspicuous following the repair. Generally, prior art repair areas protrude noticeably from the surface of the surrounding wall. It may also be fairly difficult to match the texture of the repaired area with that of the surrounding wall surface.

What is needed, therefore, is a wall repair system that avoids the need for expensive tools and repair compounds that need to cure. The industry would also be benefitted by a wall repair method that substantially reduces the number of steps, the expertise, and the amount of time required to repair a wall hole or crack. The industry would further be benefitted by a repair system and method that more easily matches the surrounding wall textures and provides a less noticeable repair area.

SUMMARY OF THE INVENTION

According to the needs of the industry, one object of the present invention is to enable a wall repair system that eliminates the need for expensive repair tools and curable repair compounds.

Another object of the present invention is to enable a wall repair system that provides an inconspicuous repair area.

Yet another object of the present invention is to enable a person to simply and reliably repair holes and cracks in sheetrock.

This invention provides a significant improvement in the art by enabling a self-adhesive wall patch that can be painted directly without the need for curing compounds, sanding, or other treatment. A wall patch according to the invention includes a substantially planar body having an inward surface and an outward surface. The body can be circular, rectangular, arranged in a strip, or configured in any other desirable shape. A preferred shape for many applications is circular or oval. The body is preferably formed from a tough, stretch and tear resistant material. The inward surface of the body comprises or accepts an adhesive to adhere to the wall surface. The outward surface of the patch is directly paintable. The outward surface may further comprise a textured surface to match the surrounding wall area.

In one embodiment, the wall patch is made of thin, flexible material such as a thin plastic film, a fibered paper, or other similar material. The material can be tough and both tear and stretch resistant. The wall patch of this embodiment can be applied directly over a hole or crack in a wall. It can then be painted to match the surrounding wall area. According to another embodiment, the wall patch is formed of a thicker, more rigid material such as sheet metal or thermoset plastic, for example. When this rigid wall patch is used, an upper surface of the wall area surrounding the hole is removed in the shape of the wall patch to form a recessed area. The depth of the recessed area should be approximately equal to the thickness of the wall patch. The wall patch is inserted into the recessed area and can then be painted directly. It can also be provided with a pre-textured upper surface. Alternatively, this rigid wall patch can be provided without a surface that is pre-textured and adapted to be paintable and can act as a center reinforcement for the wall patch of the first embodiment. In this case, the thicker wall patch is installed as described previously, but is then covered with the flexible, thin wall patch having a directly paintable, and possibly pre-textured, outward surface.

BRIEF DESCRIPTION OF THE DRAWINGS

The foregoing and other objects, features and advantages of the invention will become more readily apparent from the following detailed description of several embodiments of the invention which proceeds with reference to the accompanying drawings, in which.

DETAILED DESCRIPTION

Figure 1A:
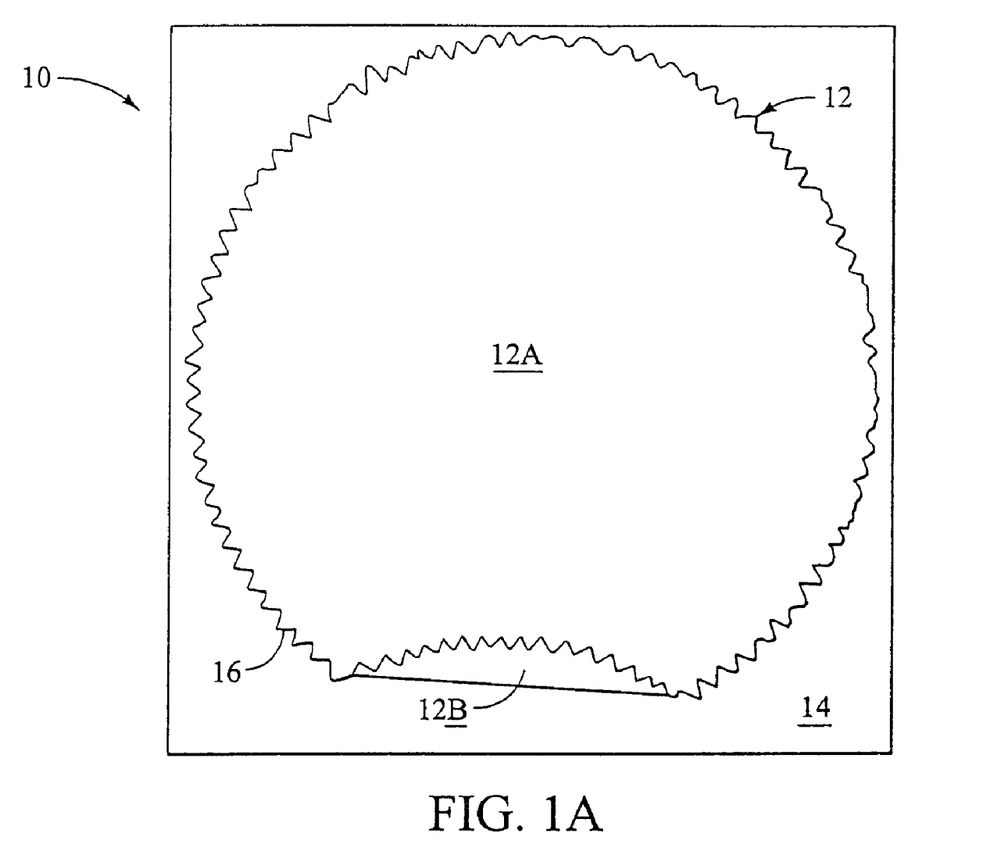
FIG. 1A is a schematic top plan view of a wall patch and adhesive backer according to a first embodiment of the present invention.
Figure 1B:
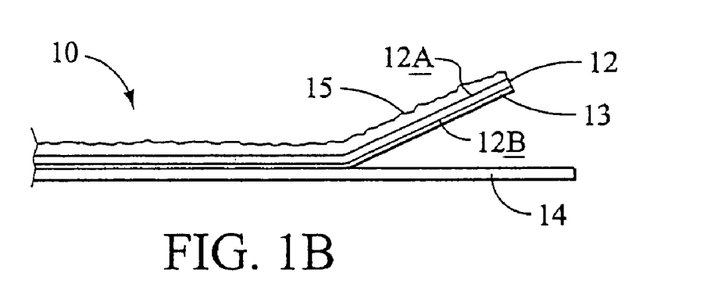
FIG. 1B is a cross-sectional view of a portion of the wall patch and backer of FIG. 1A.

Referring to FIGS. 1A and 1B, a wall patch 10 according to a first embodiment of the invention has a thin, substantially planar body 12. The body 12 can be formed of any thin, plastic film, fibered-paper, or other similar material. Preferably, the material should be fairly strong (i.e., high tensile strength and low elasticity) and be resistant to both punctures and tears. The material should also preferably be able to retain nails or other wall fasteners in a way similar to the original wall structure. Presently, the most preferred material for the body 12 is Fasson® Smudgeproof Kimdura™/S4600/78#BK biaxially oriented three-ply polypropylene film, available from Avery Dennison. It should be noted, however, that other plastics or paper can be used. A polyester film, such as Dupont's Mylar® film, could be used, for example.

The body 12 of the wall patch 10 has two surfaces 12A, 12B. A first, upper surface 12A is directly paintable. A second, lower surface 12B is provided with an adhesive layer 13 to enable the body 12 to be readily secured to a wall to be repaired. For convenience, an easily removable adhesive backing 14 is also provided, in physical communication with the adhesive layer 13 on the second surface 12B, to prevent unwanted adhesion to other surfaces.

The upper surface 12A can also be pre-textured to provide a surface texture that matches the surrounding wall textures. Pre-texturing can be done by applying a texture coat layer 15, formed from texture material commonly used in texturing sheetrock, onto the upper surface 12A of the body 12. Although traditional texture sprays consist of only mud and water, a preferred texture material according to this invention includes paint, as well as mud and water, in order to provide a durable, yet flexible texture coat layer 15 for the patch 10. The preferred formula for the texture material is one gallon of paint to five gallons of mud and one quart of water. The texture coat is applied to the upper surface 12A of the body 12 by spray coating. A wall patch 10 having a smooth upper surface 12A can also be provided for use in repairing walls that have a non-textured wall surface. Preferably, a package of wall patches or wall repair kit presented for commercial sale includes patches 10 having several different textures to allow selection of the texture that best matches the surrounding wall area. Typical textures may include light, medium, and heavy.

As can be seen from FIG. 1A, the wall patch according to the first embodiment also preferably includes a "pinked" or "feathered" edge 16 around the perimeter of the wall patch. Feathered edges 16 are desirable when repairing holes or cracks in a wall, especially when the wall has a textured surface, because the feathering enables the wall patch to mate more easily with and blend into the surrounding wall surface. Specifically, for textured wall surfaces, the feathered edge 16 allows the serrations along the edge of the wall patch to slip in between protrusions of the surrounding wall texture and the resulting repaired area is therefore less conspicuous. Even for smooth wall surfaces, however, the feathered edge breaks up the outline of the wall patch and makes it more difficult to discern the repaired area.

Other features of this embodiment also make areas repaired with it less conspicuous. For instance, the wall patch 10 of this embodiment is thin and does not require the application of a curable repair compound in use. Accordingly, the wall patch forms a tough diaphragm over the hole that is thin enough that the repaired is substantially flush with the surrounding wall area. It is therefore more difficult to identify the repaired area after the wall repair is completed than with conventional repaired areas that tend to protrude noticeably from the surrounding wall surface.

Figure 2:
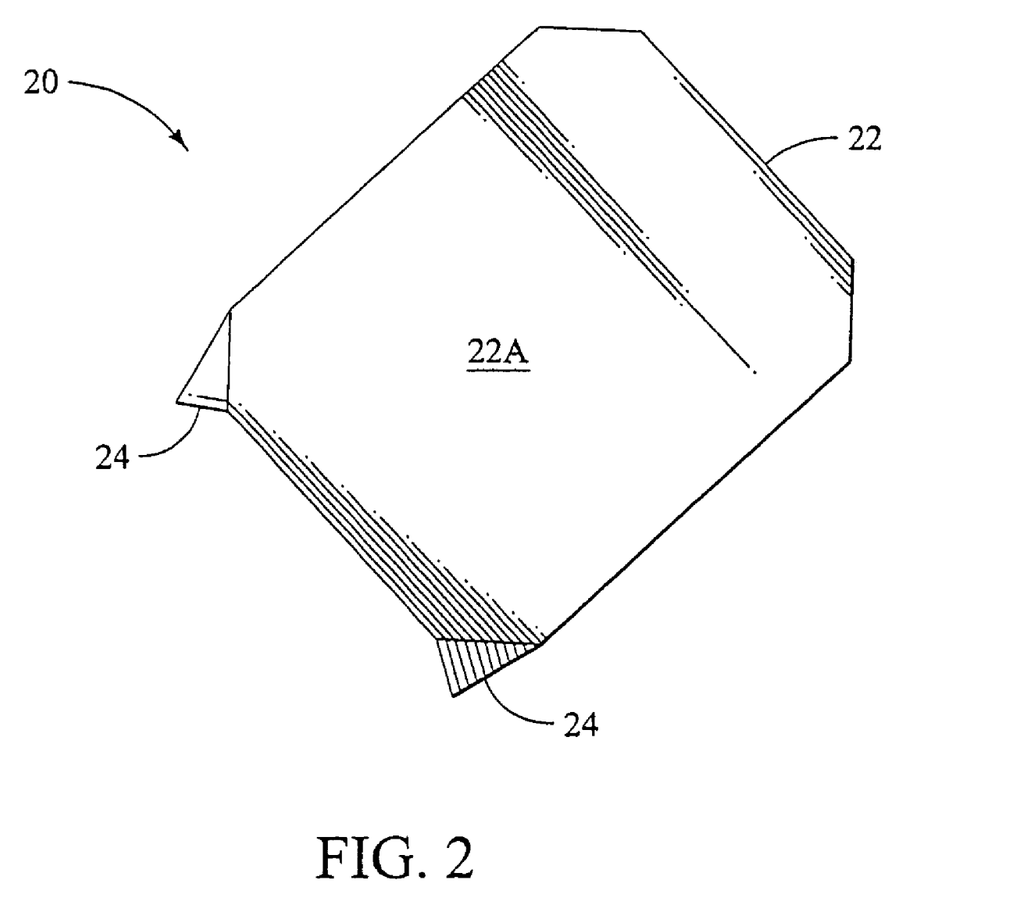
FIG. 2 is a schematic perspective view of a metal or rigid plastic wall patch according to a second embodiment of the present invention.

Turning now to FIG. 2, a second embodiment of the invention is a thicker, more rigid wall patch 20. The rigid wall patch of this embodiment can be formed of metal, such as sheet metal, or it can be plastic, such as a thermosetting or injection molded plastic. The presently preferred material is sheet metal because of its strength and its ease of cutting and bending to form the desired shape. The rigid wall patch 20 can be used independently, but is preferably used as a center reinforcement for the wall patch 10 described with reference to FIGS. 1A and 1B. If used independently, the rigid wall patch is preferably provided with a paintable upper surface 22A, such as a matte surface, on its body 22. The paintable upper surface 22A can also be pre-textured. If used in conjunction with the wall repair patch 10 previously described, however, no paintable or pre-textured surface is required on the rigid wall patch 20.

As shown in FIG. 2, the rigid wall patch 20 preferably includes one or more projections 24 for securing the wall patch to the sheetrock. In this preferred embodiment, the wall patch 20 is a thin, flat, sheet metal plate having a substantially rectangular shape with each of the four corners thereof bent inwardly to provide the projections 24 for securing the wall patch 20 to the wall. It should be noted, however, that the wall patch 20 can be made of injection molded, thermoset, or other plastic or other suitable materials and can also be configured in any desired shape or size. The wall patch, for example, could be made circular or oval. Furthermore, the projections 24 can be formed thereon in any desired manner. Also, although self-securing projections are desirable to simplify use of the wall patch, they are not essential. Nails, tacks, adhesive, as well as any other appropriate type of mechanical or chemical fastener can be used to secure the wall patch 20 to the wall instead of projections 24.

Figure 3:
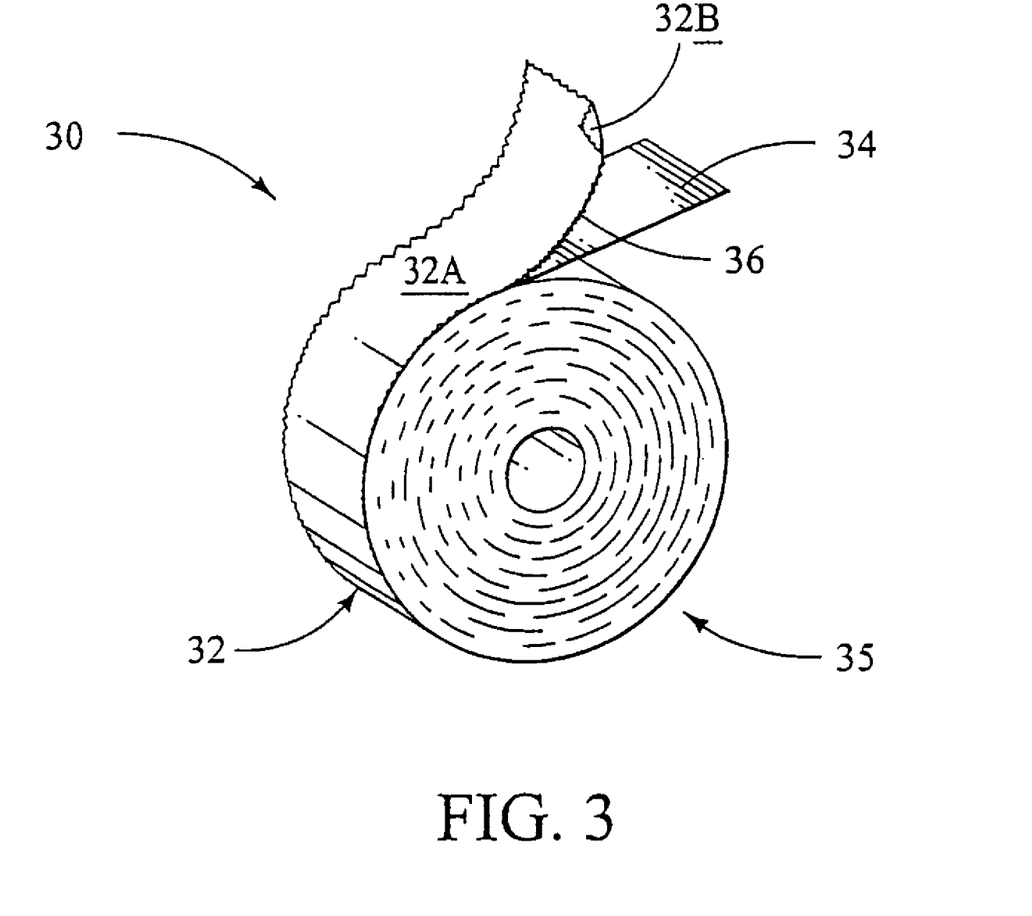
FIG. 3 is a schematic perspective view of a wall patch strip according to a third embodiment of the present invention.

Referring now to FIG. 3, a wall patch strip 30 according to a third embodiment of this invention is preferably provided on an adhesive backing 34 in a tape-like roll 35. Similar to the first embodiment, the wall patch strip 30 can be formed of a substantially planar flexible plastic film (such as Kimdura™), fibered paper, or similar material having a lower, adhesive surface 32B removably adhered to a suitable backing strip, and an upper, paintable surface 32A on its body 32. The upper surface 32A can also be pre-textured with any one of a number of textures to more readily match surrounding wall areas. The strip 30 can also be provided with feathered edges 36 to allow it to blend into the surrounding wall structure when used. The strip can be made in various widths, such as 2 inch (5 cm) and 4 inch (10 cm) widths, for example. The shape and structure of this embodiment is ideal for repairing wall cracks, as well as for covering up cracks left when doing repairs using the pre-textured rigid wall patch 20 of the second embodiment.

Figure 4:
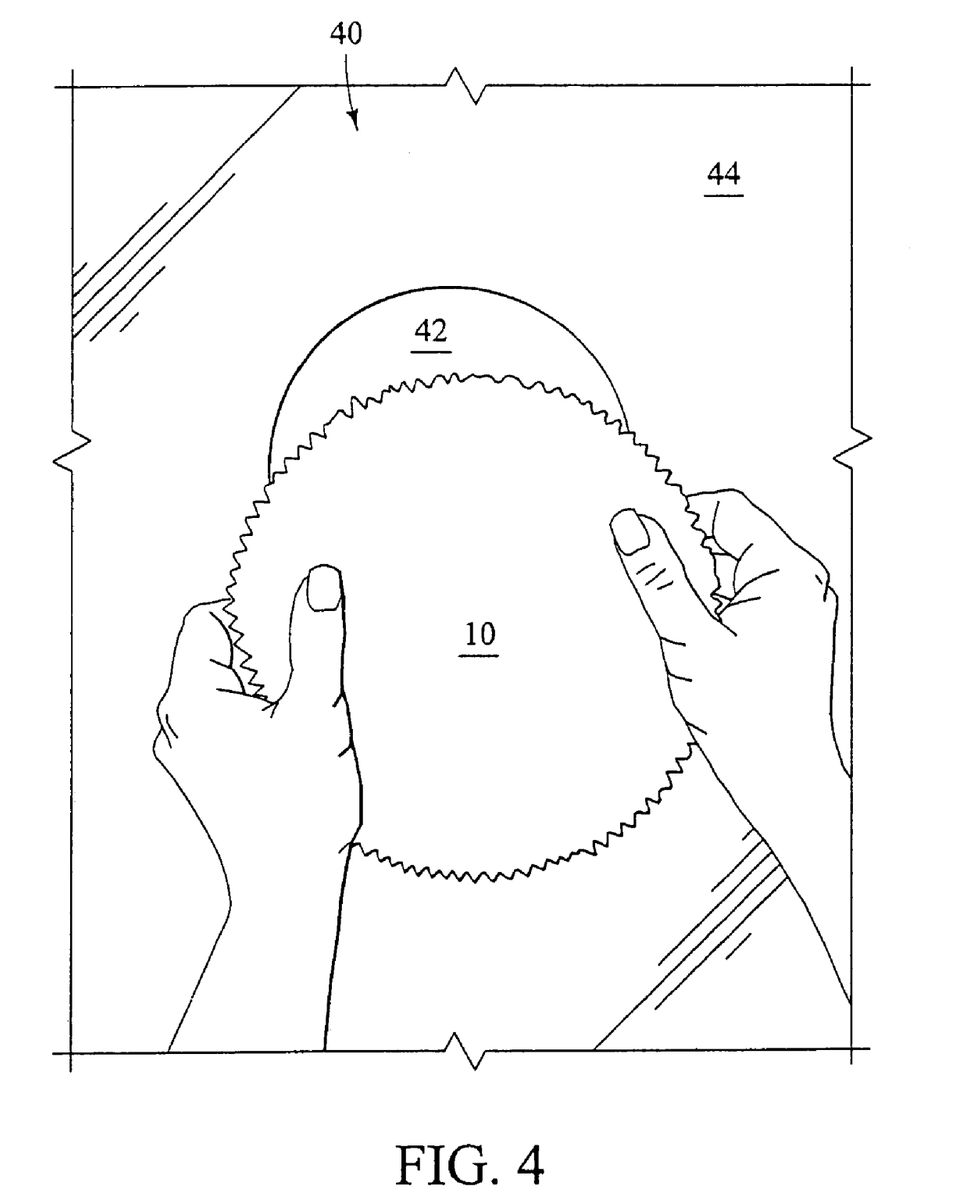
FIG. 4 is a schematic perspective view of a wall repair area illustrating a method of repairing a wall using the wall patch of FIG. 1A, according to another aspect of the invention.

Referring now to FIG. 4, a method of repairing a hole in a wall using a wall patch 10 as described with reference to FIG. 1A will now be explained. FIG. 4 is a schematic perspective view of a wall repair area 40. A method of repairing a hole 42 in a wall 44 according to this embodiment begins by selecting a wall patch 10 of an appropriate size. Various sizes can be provided, with a preferred range of sizes being from approximately 0.1 inches (2.5 mm) to 6.0 inches (15 cm). Providing various size patches allows the repair of many different size holes, ranging, for example, from nail holes to doorknob holes.

The wall surface 44 surrounding the hole 42 is cleaned to ensure good adhesion with the wall patch 10. Any rough or uneven edges protruding from the damaged wall area above the plane of the wall surface 44 are removed to allow the wall patch 10 to lie flush with the wall surface 44. The adhesive backing 14 is removed from the wall patch 10 and the patch 10 is then centered over the hole 42 and secured to the wall surface 44. Any air trapped under the margins of the wall patch 10 is pressed out from the edges 16 of the patch 10 without placing any force on the center portion of the patch 10. Once the wall patch 10 has been affixed to the wall, it can immediately be painted, and does not require the application of a curable repair compound, sanding, or any other special pre-painting treatment. Furthermore, with a pre-textured wall patch 10, there is no need to apply a texture coating to the repaired area. Accordingly, the only equipment needed for repairing a wall according to this method of the invention is a wall patch 10 and a user's hands.

Because of these features, the wall repair method of this invention provides substantial advantages over the prior art in terms of repair time, and in terms of the number of materials and tools required to perform the repair. These additional benefits make this wall patch system and method fast, convenient, and easy. Furthermore, the wall patch 10 according to this invention is strong enough to provide a durable and reliable wall repair. A still further benefit of this invention is that the resulting repair is inconspicuous.

For larger holes (i.e., holes above about 2.5 inches), it may be desirable to place a center reinforcement over the hole before using the wall patch 10. The center reinforcement can be of any desired shape and size sufficient to adequately cover the hole and secure to the wall. The center reinforcement can be a rigid structure such as the rigid wall patch 20 described with reference to FIG. 2. The use of a rigid structure for the center reinforcement is particularly desirable in areas of heavy stress, such as where doorknobs come in contact with the wall area. This type of rigid center reinforcement is preferably a thin, metal sheet, having a substantially rectangular with inwardly bent corners, as described with reference to FIG. 2.

Center reinforcements can also be made from a non-textured flexible material, such as a plastic film or fibered paper, having an adhesive attachment surface, similar to the wall patch 10 of the first embodiment. A preferred center reinforcement material is fibered paper, coated with a plastic laminate, such as is conventionally used for decals. When flexible center reinforcements are used, they are simply adhered to the wall surface centered directly over the hole before application of the wall patch 10. A preferred shape for this type of center reinforcement is circular or oval with feathered edges, similar to the wall patch 10, but without a pre-textured surface.

Figure 5:
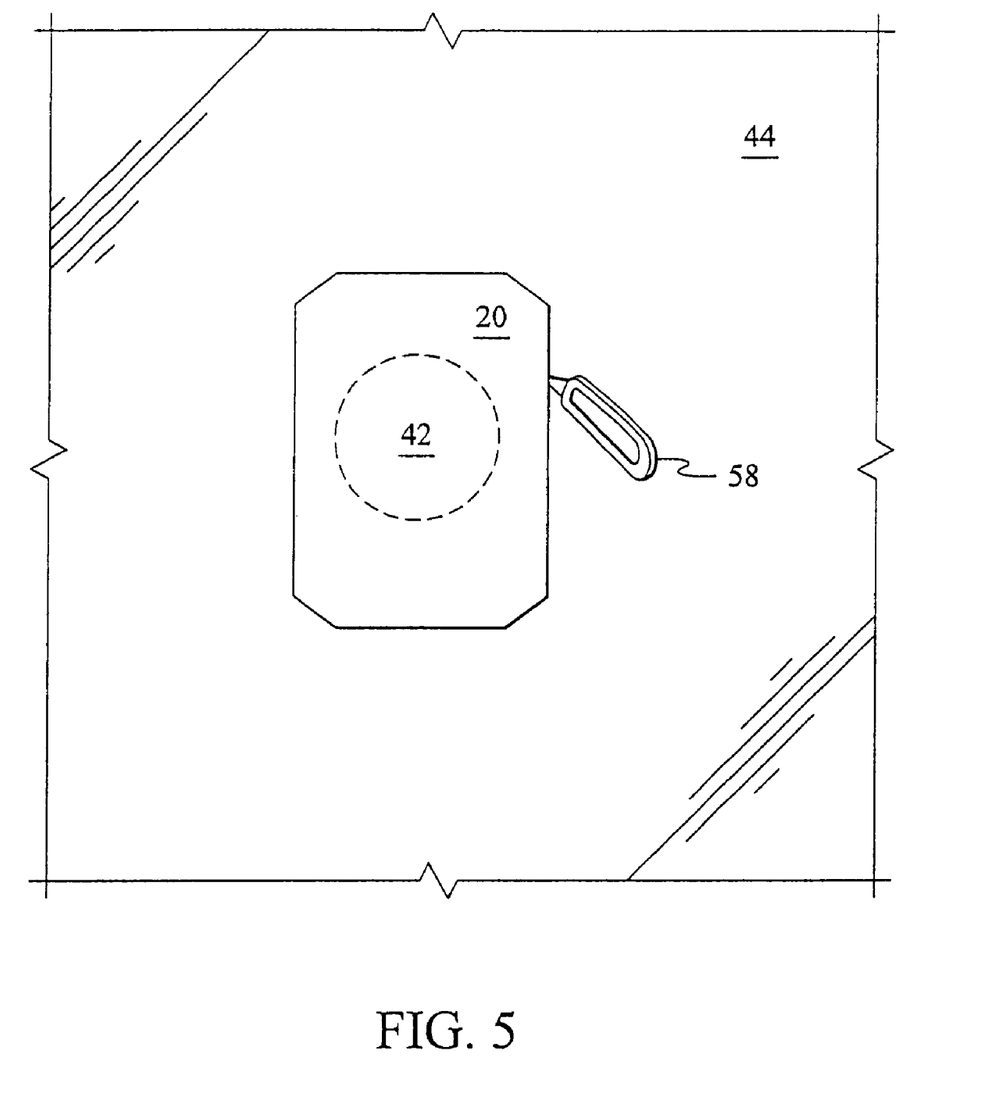
FIG. 5 is a schematic perspective view of a wall repair area illustrating a method of repairing a wall using the metal or plastic wall patch of FIG. 2, according to yet another aspect of the invention.

Referring now to FIG. 5, a method of repairing a wall hole 42 using the rigid wall patch 20 of FIG. 2, either independently or as a center reinforcement, will now be explained. Whether the rigid wall patch 20 is used as a center reinforcement or as an independent repair patch, its method of installation is basically the same. Specifically, the rigid wall patch 20 is positioned on the wall 44 over the hole 42 and temporarily secured thereto by forcing its self-securing projections 24 into the sheetrock 44. If no self-securing projections 24 are provided, the wall patch 20 can be held in place by the user's hands, by adhesive tape, or by any other type of temporary attachment. The shape of the wall patch 20 is then traced into the wall surface 44 using a sharp instrument, such as a razor blade or knife 58, or using a marking tool such as a pencil, pen, or chalk. Once the outline of the patch 20 has been traced onto the wall 44, the wall patch 20 is removed. The upper surface of the wall 44 in the traced area is then removed to a depth approximately equal to the thickness of the wall patch 20. This creates a recessed area having approximately the same size and shape as the wall patch 20. The wall patch 20 is then placed within the recessed area and secured therein by forcing its projections 24 into the remaining wall structure. The depth of the recessed area is such that an upper surface 22A of the wall patch 20 located within the recessed area is arranged flush with the wall surface 44.

If the rigid wall patch 20 is being used as a center reinforcement, a flexible wall patch 10, as described with reference to FIG. 1A, is placed over the reinforcement in the method described with reference to FIG. 4. The flexible wall patch 10 can then be painted to match the surrounding wall surface 44. If the rigid wall patch 20 is used independently, however, it is preferably provided with its own paintable (and textured, if desired) upper surface 22A and no additional wall patch 10 is required. It may be desirable, however, to cover any cracks between the rigid wall patch 20 and the surrounding wall area 44 using a wall patch strip 30 as described previously with reference to FIG. 3.

Figure 6:
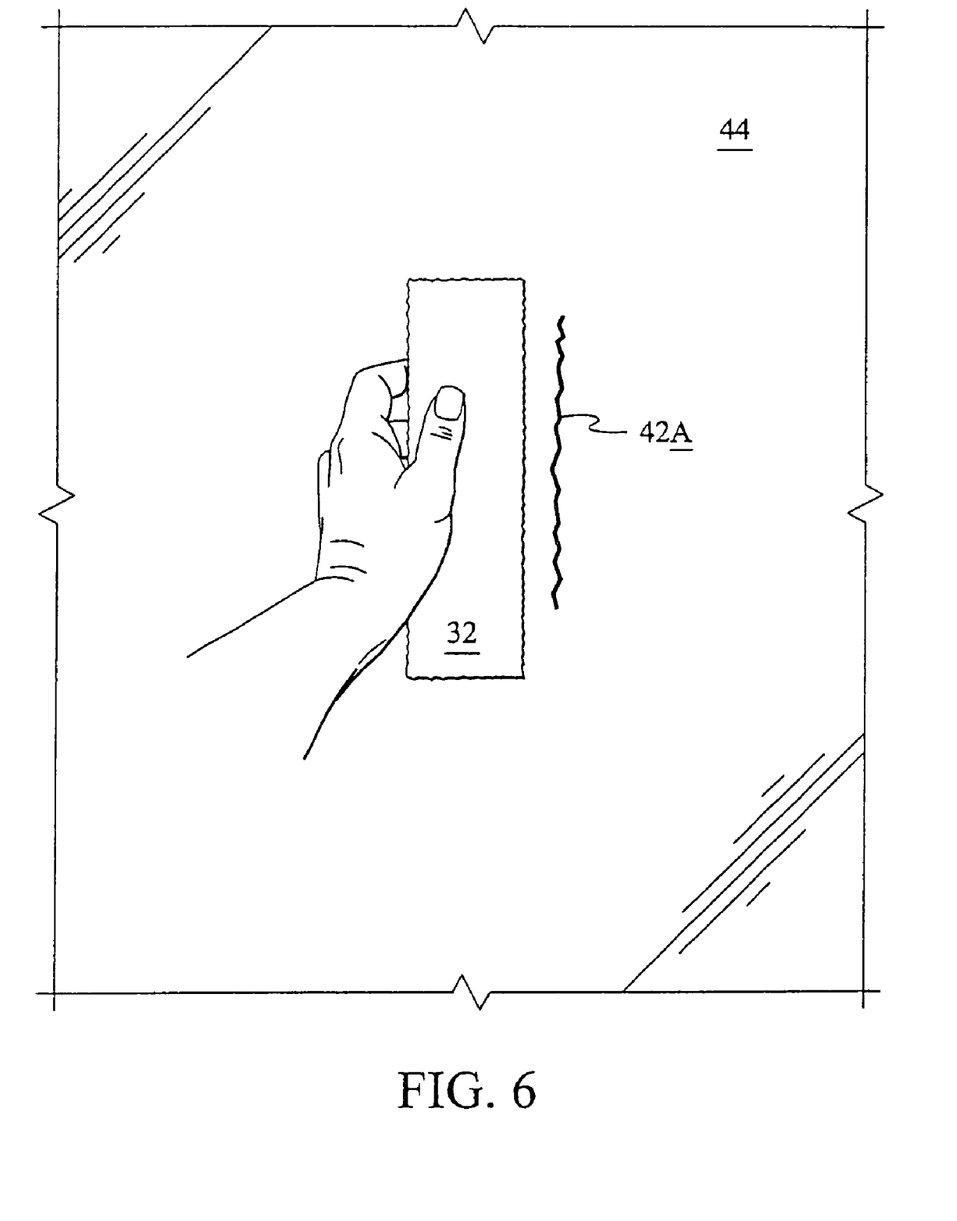
FIG. 6 is a schematic perspective view of a wall repair area illustrating a method of repairing a wall using the wall patch strip of FIG. 3.

FIG. 6 illustrates a wall area 44 having a crack 42A that needs to be repaired. Referring to FIG. 6, a method of repairing a wall crack 42A using the wall patch strip 30 of FIG. 3 will now be explained. A method of repairing a wall crack 42A proceeds by selecting (or cutting) a wall patch strip 30 of an appropriate length and width. If the strip 30 has straight edges 36, the edges 36 can be pinked using pinking shears. The wall surface 44 surrounding the crack is then cleaned to ensure good adhesion with the wall patch strip 30. Any rough or uneven edges that protrude outwards from the damaged wall area 44 are removed to allow the wall patch strip 30 to lie flush with the surrounding wall surface 44. The adhesive backing 34 is removed from the wall patch strip 30 and the strip 30 is then centered over the crack 42A and secured to the wall surface 44. Air is pressed out from the edges 36 of the wall patch strip 30. Once the wall patch strip 30 has been affixed to the wall 44, it can immediately be painted.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A wall patch, comprising:
   a sheet of film having a substantially uniform thickness, and further comprising a lower surface and an upper surface;
   a pre-textured, ready-to-paint layer applied to the upper surface; and
   an adhesive located on the lower surface of the sheet; and
   a perimeter of the sheet having a feathered edge.

2. A wall patch according to claim 1 wherein the feathered edge comprises a plurality of non-uniform serrations.

3. A wall patch according to claim 1 wherein the sheet of film comprises a polyester or polypropylene plastic film.

4. A wall patch according to claim 3 wherein the sheet is formed from a single tear-resistant material.

5. A wall patch according to claim 1 wherein the sheet is formed of a sheet of biaxially oriented three-ply polypropylene film.

6. A wall patch according to claim 1 wherein the pre-textured, ready to paint layer comprises a mixture of paint and mud applied to the wall patch during fabrication of the wall patch.

7. A wall patch according to claim 1 wherein the sheet is formed from a single puncture-resistant material.

8. A wall patch according to claim 7 wherein the material is a plastic.

9. A wall patch according to claim 8 wherein the material is a polypropylene film.

10. A wall patch according to claim 8 wherein the material is a polyester film.

11. A wall patch for repairing a hole or a crack in a wall, comprising:
    a flexible sheet having a substantially uniform thickness and including an upper surface and a lower surface;
    an adhesive layer applied to the lower surface of the sheet; and
    a ready-to-paint upper surface;
    wherein the ready-to-paint upper surface of the sheet is pre-textured.

12. A wall patch according to claim 11 wherein the ready-to-paint upper surface of the sheet is pre-textured with a mixture of mud and paint.

13. A wall patch for repairing a hole or a crack in a wall, comprising:
    a flexible sheet having a substantially uniform thickness and including an upper surface and a lower surface;
    an adhesive layer applied to the lower surface of the sheet; and
    a ready-to-paint upper surface;
    wherein one or more edges of the sheet are feathered to allow the sheet to more readily blend with a wall surface.

14. A wall patch for repairing a hole or a crack in a wall, comprising:
    a flexible sheet having a substantially uniform thickness and including an upper surface and a lower surface;
    an adhesive layer applied to the lower surface of the sheet; and
    a ready-to-paint upper surface;
    further comprising:
    a center reinforcement formed separately from the wall patch, wherein the center reinforcement is placed over the repair area before securing the wall patch.

15. A wall patch according to claim 14 wherein the center reinforcement is a rigid metal or plastic wall patch.

16. A wall patch according to claim 14 wherein the center reinforcement is a smooth, self-adhesive plastic or fibered-paper wall patch.

17. A wall patch consisting essentially of:
    a sheet formed of a tear-resistant material, said sheet having an upper surface and a lower surface;
    a pre-textured, ready-to-paint layer applied to the upper surface; and
    an adhesive layer applied to the lower surface.

18. A wall patch according to claim 17 wherein the sheet further consists of a perimeter having a feathered edge.

19. A wall patch according to claim 18, wherein the feathered edge consists of a plurality of non-uniform serrations.

* * * * *